(12) United States Patent  
Fuchs et al.

(10) Patent No.: US 8,875,502 B2
(45) Date of Patent: Nov. 4, 2014

(54) SCR EXHAUST GAS AFTERTREATMENT DEVICE

(75) Inventors: Tobias Fuchs, Biberach a. d. Riss (DE);
Andreas Lannig, Kreuzwertheim (DE);
Ralf Rohrmueller, Faulbach (DE);
Sebastian Weidner, Oberndorf (DE);
Friedrich Zapf, Karlstadt (DE)

(73) Assignee: Cummins Ltd., Staines, Middlesex (GB)

( * ) Notice: Subject to any disclaimer, the term of this patent is extended or adjusted under 35 U.S.C. 154(b) by 169 days.

(21) Appl. No.: 13/316,683

(22) Filed: Dec. 12, 2011

(65) Prior Publication Data

US 2012/0144808 A1 Jun. 14, 2012

(30) Foreign Application Priority Data

Dec. 14, 2010 (DE) .......................... 10 2010 061 222

(51) Int. Cl.
*F01N 3/10* (2006.01)
*F01N 3/20* (2006.01)
(52) U.S. Cl.
CPC .............. *F01N 3/2066* (2013.01); *Y02T 10/24* (2013.01); *F01N 2610/1466* (2013.01); *F01N 2610/14* (2013.01); *F01N 2610/1426* (2013.01); *F01N 2610/1486* (2013.01); *F01N 2610/02* (2013.01)
USPC ................... 60/303; 60/274; 60/286; 60/295; 60/301

(58) Field of Classification Search
USPC .................... 60/274, 286, 295, 297, 301, 303
See application file for complete search history.

(56) References Cited

U.S. PATENT DOCUMENTS

| | | |
|---|---|---|
| 1,059,370 A | 4/1913 | Johnson |
| 1,971,026 A | 8/1934 | Beall |
| 1,999,221 A | 4/1935 | Walker et al. |
| 2,697,581 A | 12/1954 | Ray |
| 2,938,703 A | 5/1960 | Dietz |
| 3,125,063 A | 3/1964 | Hultgren |
| 3,492,868 A | 2/1970 | Pontis |
| 3,707,954 A | 1/1973 | Nakada et al. |
| 3,894,432 A | 7/1975 | Coughlin |
| 3,903,858 A | 9/1975 | Hecht |
| 3,958,757 A | 5/1976 | Happel et al. |
| 4,146,485 A | 3/1979 | Broad |
| 4,203,554 A | 5/1980 | Zimmer et al. |
| 4,312,382 A | 1/1982 | Gebauer |

(Continued)

FOREIGN PATENT DOCUMENTS

| | | |
|---|---|---|
| CA | 2 199 737 | 3/1996 |
| CH | 359182 | 12/1961 |

(Continued)

OTHER PUBLICATIONS

Bürkert Fluid Control Systems, "Solenoid Valves with Piston, Servo-Assisted", archived Jan. 10, 2005, <URL: http://www.burkett.com/COM/print/388.html>, (1 page).

*Primary Examiner* — Binh Q Tran
(74) *Attorney, Agent, or Firm* — Krieg DeVault LLP

(57) ABSTRACT

An SCR exhaust gas aftertreatment device in which a urea-water solution is injected into an exhaust gas line is provided. At least one component of the device (e.g., a filter element) lies in an area of an internal space, and is bounded by an elastomer membrane that is embedded in a frost equalization foam. This prevents freezing damage even over a very long period of time and a large number of freezing cycles.

16 Claims, 2 Drawing Sheets

(56) References Cited

U.S. PATENT DOCUMENTS

| | | |
|---|---|---|
| 4,529,512 A | 7/1985 | Williamson et al. |
| 4,530,486 A | 7/1985 | Rusnak |
| 4,595,037 A | 6/1986 | LeBreton et al. |
| 4,610,786 A | 9/1986 | Pearson |
| 4,693,202 A | 9/1987 | Helpiö |
| 4,714,234 A | 12/1987 | Falk et al. |
| 4,742,964 A | 5/1988 | Ito et al. |
| 4,805,837 A | 2/1989 | Brooks et al. |
| 4,836,923 A | 6/1989 | Popoff et al. |
| 4,839,048 A | 6/1989 | Reed et al. |
| 4,842,737 A | 6/1989 | Reed |
| 4,963,332 A | 10/1990 | Brand et al. |
| 5,002,230 A | 3/1991 | Norskov et al. |
| 5,009,367 A | 4/1991 | Nielsen |
| 5,017,285 A | 5/1991 | Janik et al. |
| 5,045,192 A | 9/1991 | Terhune |
| 5,114,077 A | 5/1992 | Cerny |
| 5,122,264 A | 6/1992 | Mohr et al. |
| 5,236,579 A | 8/1993 | Janik et al. |
| 5,238,224 A | 8/1993 | Horsting |
| 5,299,776 A | 4/1994 | Brinn, Jr. et al. |
| 5,356,034 A | 10/1994 | Schlumberger |
| 5,399,264 A | 3/1995 | Pulek et al. |
| 5,413,711 A | 5/1995 | Janik |
| 5,468,388 A | 11/1995 | Goddard et al. |
| 5,522,218 A | 6/1996 | Lane et al. |
| 5,605,042 A | 2/1997 | Stutzenberger |
| 5,680,879 A | 10/1997 | Sheih et al. |
| 5,685,985 A | 11/1997 | Brown et al. |
| 5,884,475 A | 3/1999 | Hofmann et al. |
| 5,968,464 A | 10/1999 | Peter-Hoblyn et al. |
| 5,976,475 A | 11/1999 | Peter-Hoblyn et al. |
| 6,063,350 A | 5/2000 | Tarabulski et al. |
| 6,105,884 A | 8/2000 | Molnar et al. |
| 6,125,629 A | 10/2000 | Patchett |
| 6,203,770 B1 | 3/2001 | Peter-Hoblyn et al. |
| 6,209,315 B1 * | 4/2001 | Weigl ................ 60/274 |
| 6,279,603 B1 | 8/2001 | Czarnik et al. |
| 6,301,879 B1 * | 10/2001 | Weisweiler et al. ........... 60/274 |
| 6,306,192 B1 | 10/2001 | Greif et al. |
| 6,474,961 B1 | 11/2002 | Timmer et al. |
| 6,513,323 B1 | 2/2003 | Weigl et al. |
| 6,516,607 B1 | 2/2003 | Brück et al. |
| 6,517,047 B2 | 2/2003 | Koch-Groeber |
| 6,526,746 B1 | 3/2003 | Wu |
| 6,539,708 B1 | 4/2003 | Hofmann et al. |
| 6,550,250 B2 * | 4/2003 | Mikkelsen et al. ........... 60/685 |
| 6,554,139 B1 | 4/2003 | Maxwell et al. |
| 6,631,883 B1 | 10/2003 | Van Den Brink |
| 6,685,829 B1 | 2/2004 | Baumann et al. |
| 6,912,846 B2 | 7/2005 | Huber et al. |
| 6,945,035 B2 | 9/2005 | Hirooka et al. |
| 7,000,381 B2 | 2/2006 | Maisch |
| 7,100,366 B2 | 9/2006 | Hager et al. |
| 7,156,239 B2 | 1/2007 | Klotz et al. |
| 7,278,625 B2 | 10/2007 | Huber et al. |
| 7,296,689 B2 | 11/2007 | Klotz et al. |
| 7,316,545 B2 | 1/2008 | Lenke |
| 7,393,187 B2 | 7/2008 | Weigl |
| 7,454,898 B2 * | 11/2008 | Allgeier et al. ............. 60/286 |
| 7,458,204 B2 | 12/2008 | Plougmann |
| 7,481,049 B2 | 1/2009 | Huber et al. |
| 7,509,799 B2 | 3/2009 | Amou et al. |
| 7,594,393 B2 | 9/2009 | Offenhuber et al. |
| 7,594,516 B2 | 9/2009 | Maisch et al. |
| 7,617,991 B2 | 11/2009 | Wells et al. |
| 7,654,080 B2 * | 2/2010 | Ripper et al. ............ 60/286 |
| 7,866,144 B2 * | 1/2011 | Bakaj et al. ............ 60/286 |
| 7,895,829 B2 | 3/2011 | Suzuki et al. |
| 8,074,673 B2 | 12/2011 | Maisch et al. |
| 8,096,112 B2 * | 1/2012 | Dalton ................ 60/295 |
| 2002/0001554 A1 | 1/2002 | Czarnik et al. |
| 2002/0078732 A1 | 6/2002 | Bentley |
| 2002/0081239 A1 | 6/2002 | Palesch et al. |
| 2002/0088955 A1 | 7/2002 | Gamou et al. |
| 2003/0024320 A1 | 2/2003 | Bentley |
| 2003/0033799 A1 | 2/2003 | Scheying |
| 2003/0101716 A1 | 6/2003 | Hirooka et al. |
| 2003/0168620 A1 | 9/2003 | Dralyuk |
| 2003/0209482 A1 | 11/2003 | Klotz et al. |
| 2003/0209484 A1 | 11/2003 | Klotz et al. |
| 2004/0060286 A1 | 4/2004 | Huber et al. |
| 2004/0093856 A1 | 5/2004 | Dingle et al. |
| 2004/0098978 A1 | 5/2004 | Tarabulski et al. |
| 2004/0101450 A1 | 5/2004 | Mayer |
| 2004/0103641 A1 | 6/2004 | Maisch |
| 2004/0159721 A1 | 8/2004 | Shiraishi et al. |
| 2004/0179960 A1 | 9/2004 | Lenke |
| 2004/0191093 A1 | 9/2004 | Weigl |
| 2004/0262333 A1 | 12/2004 | Huber et al. |
| 2005/0069468 A1 | 3/2005 | Huber et al. |
| 2005/0229969 A1 | 10/2005 | Nguyen et al. |
| 2005/0284136 A1 | 12/2005 | Plougmann |
| 2006/0196172 A1 | 9/2006 | Johnson et al. |
| 2008/0178580 A1 | 7/2008 | Zapf et al. |
| 2008/0311010 A1 | 12/2008 | Boe |
| 2009/0013670 A1 | 1/2009 | Cooke |
| 2009/0038292 A1 | 2/2009 | Plougmann |
| 2009/0229258 A1 | 9/2009 | Zapf et al. |
| 2010/0064670 A1 * | 3/2010 | Starck et al. .................... 60/295 |
| 2011/0023466 A1 | 2/2011 | Branco et al. |

FOREIGN PATENT DOCUMENTS

| | | |
|---|---|---|
| DE | 1 148 614 | 5/1963 |
| DE | 2 121 533 | 11/1972 |
| DE | 2 211 096 | 9/1973 |
| DE | 101 61 132 | 9/1973 |
| DE | 24 59 790 | 7/1976 |
| DE | 83 06 612 | 8/1983 |
| DE | 39 01 032 | 2/1990 |
| DE | 38 33 134 | 4/1990 |
| DE | 41 04 382 | 8/1992 |
| DE | 42 37 900 | 5/1993 |
| DE | 42 30 056 | 3/1994 |
| DE | 43 21 927 | 1/1995 |
| DE | 44 32 576 | 3/1996 |
| DE | 44 32 577 | 3/1996 |
| DE | 44 36 397 | 4/1996 |
| DE | 195 36 613 | 11/1996 |
| DE | 198 17 994 | 11/1999 |
| DE | 198 40 569 | 3/2000 |
| DE | 199 08 671 | 8/2000 |
| DE | 199 45 900 | 4/2001 |
| DE | 199 47 198 | 4/2001 |
| DE | 100 47 516 | 4/2002 |
| DE | 100 47 531 | 4/2002 |
| DE | 100 52 077 | 5/2002 |
| DE | 100 52 103 | 5/2002 |
| DE | 100 58 015 | 5/2002 |
| DE | 101 39 142 | 2/2003 |
| DE | 101 47 172 | 4/2003 |
| DE | 199 35 920 | 4/2003 |
| DE | 10 2006 014 074 | 5/2003 |
| DE | 101 39 139 | 6/2003 |
| DE | 101 50 518 | 6/2003 |
| DE | 102 56 169 | 6/2003 |
| DE | 102 20 672 | 11/2003 |
| DE | 699 10 605 | 6/2004 |
| DE | 699 10 776 | 6/2004 |
| DE | 10 2004 054 238 | 7/2004 |
| DE | 20 2005 002 544 | 6/2005 |
| DE | 103 59 522 | 7/2005 |
| DE | 10 2004 003 201 | 8/2005 |
| DE | 102 20 662 | 8/2005 |
| DE | 10 2004 006 333 | 9/2005 |
| DE | 10 2004 035 119 | 2/2006 |
| DE | 10 2005 037 150 | 5/2006 |
| DE | 20 2004 020 234 | 6/2006 |
| DE | 10 2005 056 395 | 11/2006 |
| DE | 10 2005 030 421 | 1/2007 |
| DE | 103 41 996 | 2/2007 |
| DE | 103 62 140 | 4/2008 |
| DE | 10 2007 004 687 | 8/2008 |

(56) References Cited

FOREIGN PATENT DOCUMENTS

| | | |
|---|---|---|
| DE | 10 2008 012 780 | 9/2009 |
| DE | 10 2008 054 803 | 6/2010 |
| DE | 10 2009 035 940 | 2/2011 |
| EP | 0 663 226 | 7/1995 |
| EP | 0 826 097 | 11/1998 |
| EP | 1 236 499 | 9/2002 |
| EP | 1 281 426 | 2/2003 |
| EP | 1 314 864 | 5/2003 |
| EP | 1 360 983 | 11/2003 |
| EP | 1 481 719 | 12/2004 |
| EP | 1 656 986 | 5/2006 |
| EP | 1 435 458 | 10/2007 |
| EP | 2 014 886 | 1/2009 |
| GB | 2 137 110 | 10/1984 |
| JP | 56 164287 | 12/1981 |
| JP | 61197013 | 9/1986 |
| JP | 2000-240429 | 9/2000 |
| JP | 2001280189 | 10/2001 |
| JP | 2002525491 | 8/2002 |
| WO | 28 12 076 | 10/1973 |
| WO | 01/91881 | 12/2001 |
| WO | 02/27280 | 4/2002 |
| WO | 02/42616 | 5/2002 |
| WO | 02/50497 | 6/2002 |
| WO | 03/016687 | 2/2003 |
| WO | 03/085270 | 10/2003 |
| WO | 2004/079168 | 9/2004 |
| WO | 2006/122561 | 11/2006 |

\* cited by examiner

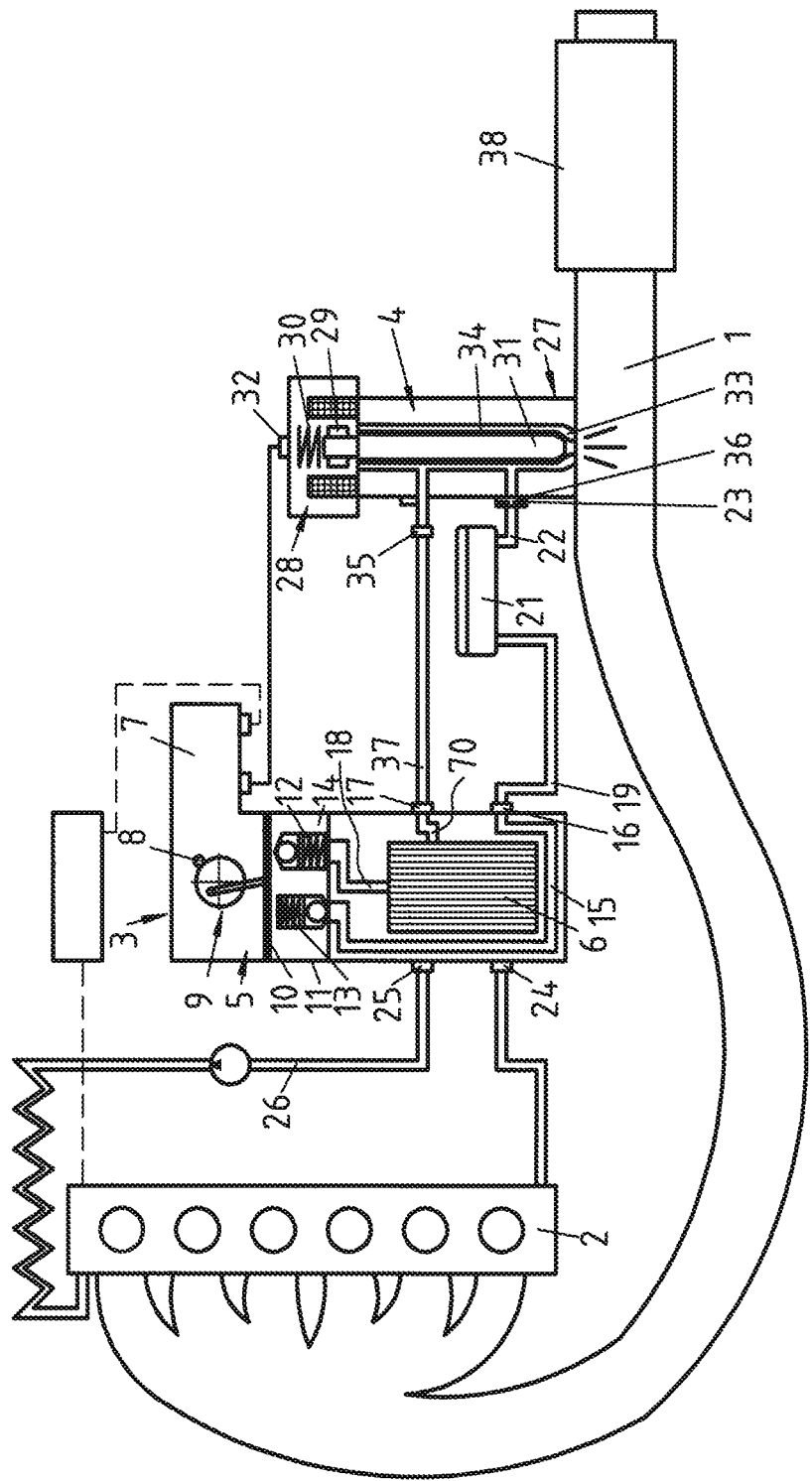

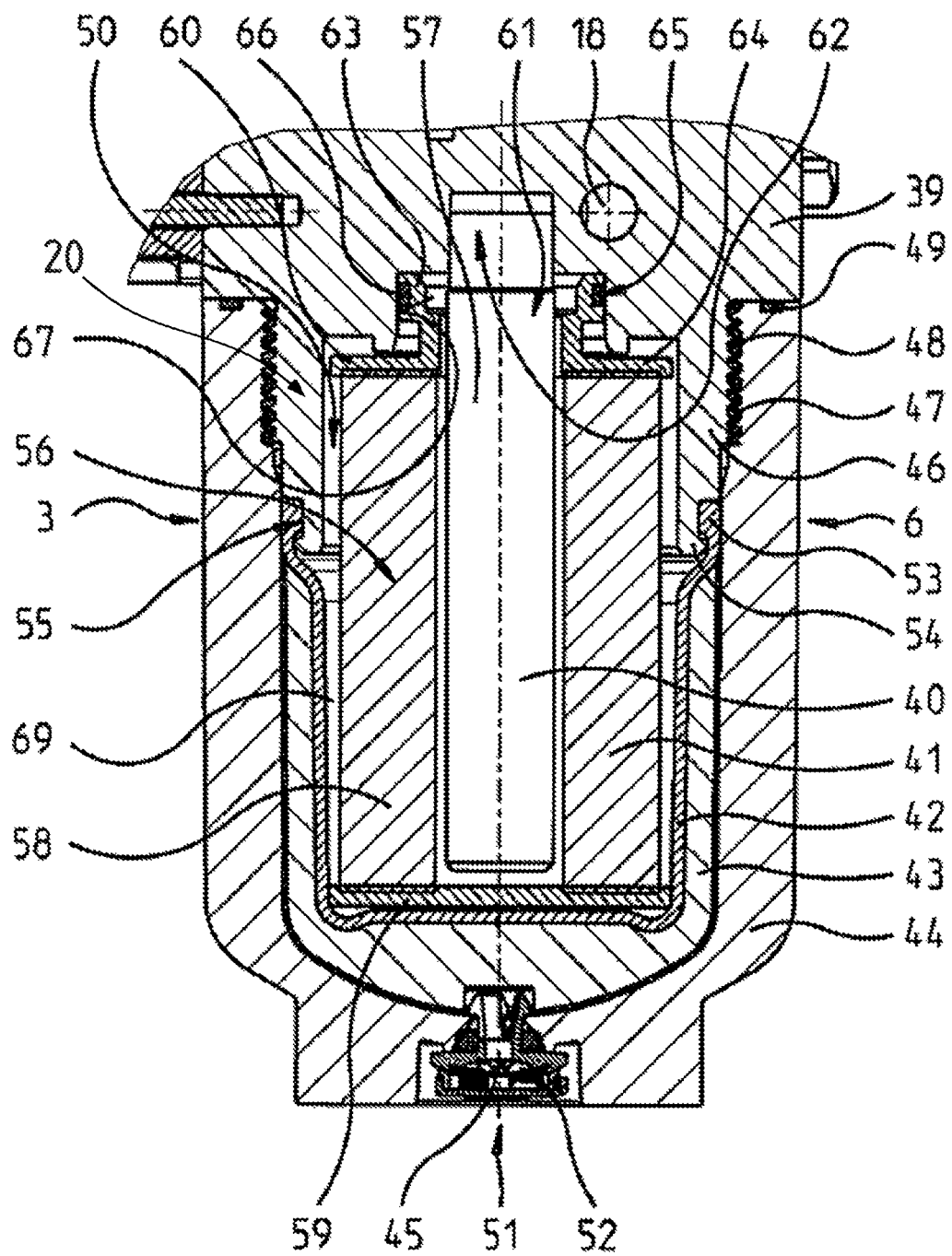

SCR EXHAUST GAS AFTERTREATMENT DEVICE

The present application claims priority of German application number 10 2010 061 222.7 filed on Dec. 14, 2010, which is incorporated herein by reference in its entirety for all purposes.

BACKGROUND OF THE INVENTION

The invention concerns an SCR exhaust gas aftertreatment device designed to protect against freezing damage.

An SCR exhaust gas aftertreatment device is already known from DE 10 2008 012 780 A1. In it, a urea-water solution is injected into an exhaust gas line. A pump unit with a pressure filter is provided to produce the pressure needed for injecting the urea-water solution. This pressure filter lies in the area of an internal space of the pump unit. A compressible equalization element is also arranged on the pump unit. However, this equalization element does not lie in the area of the pressure filter.

The urea-water solution is abbreviated UWS hereafter.

Furthermore, filters for a UWS are known from DE 102 20 662 B4 and DE 102 20 672. These filters are structurally designed for expansion upon freezing of the UWS.

DE 103 62 140 B4 concerns an extension part made from an elastomer material, which yields when freezing UWS expands.

SUMMARY OF THE INVENTION

The problem to be solved by the present invention is to protect components with UWS arranged in internal spaces of a SCR exhaust gas aftertreatment device against freezing damage over a very long period of time with a large number of freezing cycles.

For this, a frost equalization foam is provided, whose surface is protected against penetration of UWS by an elastomer membrane. It has been found that UWS over a lengthy time can destroy even closed-pore foams, since the sharp-edged urea crystals after several freezing cycles can tear the thin foam walls. UWS then gets into the internal space of such a foam bubble and expands upon freezing, so that gradually the foam is destroyed after a multitude of freezing cycles. But the elastomer membrane of the invention is designed to be sufficiently thick that the frozen urea crystals cannot tear it. Thus, the UWS cannot penetrate into the foam bubble.

The invention encompasses a greater range of structural configurations of the frost equalization foam. As an example, even an open-pore foam can be utilized in accordance with the present invention, which can be designed according to other structural, cost, or manufacturing requirements. For example, workability is one such requirement. In particular, however, one can also choose a material that maintains its elasticity over a long lifetime. In addition, with the present invention, the foam does not have to be resistant to the very corrosive and creep-prone UWS.

In one example embodiment of the invention, the elastomer membrane together with the frost equalization foam is designed to be so rigid that it prevents a volume decrease greater than 10% at a pressure of 10 bars.

In a further example embodiment, a ventilation element can be provided. With this ventilation element, an air loss occurring over a lengthy term of operation can be equalized. This ventilation element may be connected to the surrounding atmospheric pressure in air and vapor permeable fashion. On the other hand, it may not be liquid-permeable.

The component being protected may be a filter element, whose inner dead space is filled up by a plug, so that the volume of the freezing UWS and thus also its volume increase upon freezing is kept small.

Further benefits and advantages of the invention will emerge from the claims, the specification, and the drawings.

BRIEF DESCRIPTION OF THE DRAWINGS

The present invention will hereinafter be described in conjunction with the appended drawing figures, wherein like reference numerals denote like elements, and:

FIG. 1 shows, schematically, an exhaust gas aftertreatment device with a pressure filter protected against freezing, and FIG. 2 shows the pressure filter of FIG. 1 in detail.

DETAILED DESCRIPTION

FIG. 1 shows schematically an exhaust gas aftertreatment device, by which a UWS is injected into an exhaust gas flow 1 of a Diesel motor 2. The exhaust gas aftertreatment device has a pump unit 3, which aspirates the UWS and pressurizes the UWS and delivers it under pressure to a dispensing unit 4, which injects a portion of the UWS into the hot exhaust gas flow 1. Furthermore, the dispensing unit 4 is cooled by the UWS flowing in the circuit between the pump unit 3 and the dispensing unit 4.

The pump unit 3 comprises a pump 5, a pressure filter 6 and a control unit 7.

The pump 5 is designed as a membrane pump and comprises a brushless electric motor 8 with an eccentric gearing 9 working similar to a crank mechanism. This eccentric gearing 9 moves the central region of a membrane 10 back and forth, the membrane 10 being clamped at its periphery in a housing 11. Two check valves 12, 13 are installed in the housing 11. One check valve 12 opens in one direction, so that a pressure space 14 which can be pressurized by the membrane 10 can deliver pressurized UWS. The other check valve 13 opens in the opposite direction, so that the pressure space 14 can draw in UWS. From each check valve 12, 13 there proceeds a dedicated channel worked into the housing 11. The check valve 13 taking in UWS draws in the UWS by an intake channel 15 from a UWS intake port 16.

From the pressure space 14, the UWS is conveyed by the membrane 10 across the other check valve 12 and via a pressure channel 18 to the pressure filter 6.

A borehole (not shown in the drawings) emerges from the pressure channel 18 in the housing 11, with a pressure limiting valve being press-fitted in the boring. This pressure limiting valve opens at a limit pressure and conveys the UWS to a drain channel, which feeds the UWS once again to the intake channel 15. In order to safely keep the easily percolating UWS out of the environment, there is provided on the one hand a gasket ring at the pressure limiting valve. On the other hand, an additional cover closes the borehole for the pressure limiting valve, which has an additional sealing feature relative to the housing 11.

From the pressure filter 6, the UWS is taken to a UWS pressure port 17. The dispensing unit 4 is protected against dirt particles and, thus, clogging up by the pressure filter 6. The UWS pressure port 17 after the pressure filter 6 is connected to a UWS line 37. By this external UWS line 37, the UWS pressure port 17 is connected to the dispensing unit 4. By a UWS line 19, the UWS intake port 16 of the pump unit 3 is connected to a tank 21 of UWS.

By another UWS line 22, the dispensing unit 4 is connected to the tank 21, so that a circulation is formed with the flow across a return diaphragm 23 in the dispensing unit 4.

The pump unit 3 has two cooling water ports 24, 25. These two cooling water ports 24, 25 lead to the two ends of a cooling channel, which is worked into the housing 11. Since the two cooling water ports 24, 25 on the other hand are switched into a cooling water circuit 26 of the Diesel motor 2, the pump unit 3 can thus be thawed by the hot cooling water from the cooling water circuit 26 or held at an operational warm temperature.

The dispensing unit 4 comprises the electromagnetic dispensing valve 27. This electromagnetic dispensing valve 27 has an electromagnet 28 with an armature 29, which can compress a helical compression spring 30 against its spring force, so that the UWS pressure can push a needle 31 into an opened position. If the electromagnet 28 is not energized by its connections 32, the helical compression spring 30 again pushes the needle 31 against a valve seat 33 into a closed position. The needle 31 is arranged relatively long in a cooling channel 34, which closes the circulation between two dispensing unit ports 35, 36. The dispensing unit ports 35, 36 are connected to the UWS lines 22, 37. If the UWS is admitted through a central opening in the valve seat 33 when the electromagnet 28 is in the energized condition, the UWS will be taken through an atomizing nozzle. This atomizing nozzle is designed as a swirl nozzle with nozzle disks. Thanks to its configuration, the outflowing UWS is given a swirl, which atomizes the UWS upon its emergence from the atomizing nozzle.

The UWS is injected into a region of the exhaust gas line 1 situated upstream from a catalyst 38.

In the region of the UWS line 37, the pressure and the temperature of the exhaust gas aftertreatment device can be determined by means of a pressure and temperature sensor (not shown in the drawings).

The dispensing unit 4 has the return diaphragm 23 in the region of the dispensing unit port 36. By this return diaphragm 36, a constant flow of UWS through the dispensing unit 4 is assured. In this way, on the one hand the temperature of the dispensing unit 4 is kept low. On the other hand, when the power supply is switched off, the pressure in the exhaust gas aftertreatment device is relaxed to the tank pressure, without needing energy for the opening of a valve to do this.

All components of the exhaust gas aftertreatment device are designed so that a freezing of the pressureless UWS does not result in damage.

FIG. 2 shows the pump unit 3, also known as a supply unit, in the installation area of the pressure filter 6. This pressure filter 6 has a pump port housing 39, a plug designed as a press-fit bolt 40, a filter element 41, an elastomer membrane 42, a frost equalizing foam 43, a filter housing 44, and a ventilating membrane 45.

The pump port housing 39 is made of aluminum. It has a receiving part 20 with a sleevelike region 46. An outer thread 47 is provided on this sleevelike region 46. The filter housing 44 is screwed onto this outer thread 47. For this, the filter housing 44 is bell-shaped. At the inside of the screwing region, the filter housing 44 has an internal thread 48 that is screwed into the outer thread 47. When the filter housing 44 is screwed onto the pump housing 39, the bell-shaped filter housing 44 presses a ring-shaped sealing element 49 against the pump housing 39. The sealing element 49 tightly closes off the inner space 50 inside the filter housing 44, although an air exchange occurs via the ventilating membrane 45, which is arranged in a ventilation element 51. The ventilation element 51 is locked in a funnel-shaped opening 52 in a bell bottom of the filter housing 44.

The frost equalizing foam 43 is placed in the filter housing 44. The frost equalizing foam 43 also has a corresponding bell shape. Inside this frost equalizing foam 43 is inserted the pot-shaped elastomer membrane 42. The upper edge of this elastomer membrane 42 is provided with a bulge 53. This bulge 53 is pushed by a ring-shaped peripheral locking lug 54 of the sleeve-shaped region 46 and inserted into an annular groove 55 lying behind it. The bulge 53 is stressed with radial pressure against the filter housing 44 by the sleeve-shaped region 46. The filter element 41 is inserted in the inner space 56 formed inside the sleeve-shaped region 46 and the elastomer membrane 42. This filter element 41 has a central recess 57. The press-fit bolt 40 extends inside this recess 57, one end of which is press-fitted into the pump port housing 39.

The filter element 41 has a paper filter 58, which is closed off at the bottom by a cover 59. Moreover, the filter element 41 has a closure ring 60, which closes the paper filter 58 at the side lying opposite the cover 59. The press-fit bolt 40 sticks through a central recess 61 of the closure ring 60 as far as a blind borehole 62 inside the pump port housing 39, in which the press-fit bolt 40 is fitted. The closure ring 60 comprises a side facing towards the pump port housing 39. On this side the closure ring 60 comprises a sealing sleeve 63. This sealing sleeve 63 makes a single piece with a disk-shaped region 64 of the closure ring 60. The closure ring 60 comprises an end facing towards the pump port housing 39. This end is provided with a peripheral annular groove 65 in which an O-ring 66 is installed. The sealing sleeve 63 is inserted in a recess 67 of the pump port housing 39, so that the O-ring 66 is sealed against the inner wall of this recess 67.

The UWS is taken via the pressure channel 18 and the central recess 61 to the inner space 57 inside the paper filter 58. From there, the UWS is forced under the operating pressure of the pump 5 of up to 10 bar through the paper filter 58. In this way, the UWS gets into an annular space 69 that is bounded radially on the inside by the paper filter 58 and radially on the outside by the sleeve-shaped region 46 and the elastomer membrane 42. From this annular space 69, the UWS is brought out through a channel 70 in the pump port housing 39, which can be seen symbolically in FIG. 1.

After the Diesel motor 2 is shut off—or possibly also in an emergency or a power outage—UWS remains in the annular space 69, which freezes at outdoor temperatures below the freezing point of the UWS. The transition from the liquid to the solid state of aggregation is accompanied by an expansion at very high pressure.

Since the intake channel 15, the pressure channel 18 and the channel 70 owing to their small cross section freeze up before the inner space 50 in time, additional pressure may be created in the inner space 50 on occasion.

This high pressure presses against the relatively thick elastomer membrane 42, which consists of HNBR, in order to keep the damage as slight as possible in event of a filling of Diesel fuel instead of UWS by mistake. Thus, this relatively easily elastically deformable elastomer membrane 42 transmits the pressure to the frost equalizing foam 43. The frost equalizing foam 43 is compressed when the pressure exceeds a limit value of 10 bar. At this pressure, little or no gas escapes from the ventilating element 51. The frost equalizing foam 43 is in fact a closed-pore foam, so that only the pressure inside the foam bubbles is increased. However, there will basically be a passage of gas through the walls of the foam bubbles over the lifetime of the foam. The ventilating element 51 itself is gas-permeable. But even the elastomer membrane 42 is in a very slight degree gas-permeable, depending on the size of the gas molecule. But thanks to the ventilating element 51, atmospheric air can get through to the frost equalizing foam 43 and so compensate for a gas loss occurring over the years through the elastomer membrane 42.

The pump port housing need not be made of aluminum. Stainless steel or a plastic resistant to UWS is equally feasible.

The filter housing is not in contact with the UWS, so that an especially large choice of material is available for the filter housing. For example, plastics may be used for the filter housing.

The filter element need not be made of a paper filter. Other materials are also possible, depending on the sensitivity of the dispensing unit.

The embodiments described herein are only example embodiments. A combination of the features described for different embodiments is likewise possible. Other features of the device parts belonging to the invention, especially those not described, can be found in the geometries of the device parts as depicted in the drawings.

LIST OF REFERENCE NUMBERS 1 exhaust gas flow
2 Diesel motor
3 pump unit
4 dispensing unit
5 pump
6 pressure filter
7 control unit
8 electric motor
9 eccentric gearing
10 membrane
11 housing
12 check valve
13 check valve
14 pressure space
15 intake channel
16 intake port
17 UWS pressure port
18 pressure channel
19 UWS line
20 receiving part
21 tank
22 UWS line
23 return diaphragm
24 cooling water port
25 cooling water port
26 cooling water circuit
27 dispensing valve
28 electromagnet
29 armature
30 helical compression spring
31 needle
32 connections
33 valve seat
34 refrigerant channel
35 dispensing unit port
36 dispensing unit port
37 UWS line
38 catalyst
39 pump port housing
40 press-fit bolt
41 filter element
42 elastomer membrane
43 frost equalizing foam
44 filter housing
45 ventilating membrane
46 sleevelike region
47 outer thread
48 internal thread
49 sealing element
50 inner space
51 ventilation element
52 opening
53 bulge
54 locking lug
55 annular groove
56 inner space
57 recess
58 paper filter
59 cover
60 closure ring
61 recess
62 blind borehole
63 sealing sleeve
64 disk-shaped region
65 annular groove
66 O-ring
67 recess
69 annular space

What is claimed is:

1. An SCR exhaust gas aftertreatment device for injecting a urea-water solution into an exhaust gas line, comprising:
   at least one filter element arranged in an area of an internal space of the device and in contact with the urea-water solution, and
   an elastomer membrane embedded in a frost equalization foam bounding the at least one filter element, wherein the elastomer membrane and the frost equalization foam surround at least a portion of the filter element when the filter element is received in the internal space of the device.

2. The SCR exhaust gas aftertreatment device according to claim 1, wherein the elastomer membrane together with the frost equalization foam is designed to be sufficiently rigid so as to prevent a volume decrease greater than 10% at a pressure of 10 bars.

3. The SCR exhaust gas aftertreatment device according to claim 1, further comprising a ventilation element which allows a pressure equalization upon changes in volume of the frost equalization foam.

4. The SCR exhaust gas aftertreatment device according to claim 3, wherein the ventilating element comprises a gas-permeable and water-impermeable separating element.

5. The SCR exhaust gas aftertreatment device according to claim 1, further comprising a plug arranged inside the filter element.

6. The SCR exhaust gas aftertreatment device according to claim 1, further wherein the filter element is installed in a rigid receiving part, in which the elastomer membrane is tightly installed.

7. The SCR exhaust gas aftertreatment device according to claim 6, further comprising a filter housing fastened on the receiving part, which presses a sealing bulge of the elastomer membrane against the receiving part.

8. The SCR exhaust gas aftertreatment device according to claim 6, wherein the receiving part is sealed off against the filter housing by means of a sealing element.

9. An SCR exhaust gas aftertreatment device for injecting a urea-water solution into an exhaust gas line, comprising:

a filter element for cleaning of the urea-water solution arranged in an area of an internal space of the device and in contact with the urea-water solution, and an elastomer membrane including a first portion surrounding at least a portion of the filter element, the first portion of the elastomer membrane being embedded in a frost equalization foam surrounding the filter element;

wherein the filter element is installed in a rigid receiving part, in which the elastomer membrane is tightly installed.

10. The SCR exhaust gas aftertreatment device according to claim 9, further comprising a filter housing fastened on the receiving part, which presses a sealing bulge of the elastomer membrane against the receiving part.

11. The SCR exhaust gas aftertreatment device according to claim 9, wherein the receiving part is sealed against the filter housing by means of a sealing element.

12. A filter assembly for an SCR exhaust gas aftertreatment system configured for injecting a urea-water solution into an exhaust gas line, the assembly comprising:

a filter housing including an internal cavity configured to receive a filter element, a frost equalization foam lining at least a portion of the internal cavity of the filter housing; and an elastomer membrane embedded in the frost equalization foam;

wherein the elastomer membrane and the frost equalization foam surround at least a portion of the filter element when the filter element is received in the internal cavity.

13. The filter assembly of claim 12 wherein the elastomer membrane together with the frost equalization foam is designed to be sufficiently rigid so as to prevent a volume decrease greater than 10% at a pressure of 10 bars.

14. The filter assembly of claim 12 further comprising a ventilation element which allows a pressure equalization upon changes in volume of the frost equalization foam.

15. The filter assembly of claim 14 wherein the ventilating element comprises a gas-permeable and water-impermeable separating element.

16. The filter assembly of claim 12 wherein the receiving part is sealed off against the filter housing by means of a sealing element.

* * * * *